(12) United States Patent
Juhasz et al.

(10) Patent No.: US 10,648,678 B2
(45) Date of Patent: May 12, 2020

(54) BUILDING-INTEGRATED SOLAR ENERGY SYSTEM

(71) Applicant: Tenkiv, Inc., Sacramento, CA (US)

(72) Inventors: Zachary Juhasz, Sacramento, CA (US); William Juhasz, Sacramento, CA (US)

(73) Assignee: TENKIV, INC., Sacramento, CA (US)

( * ) Notice: Subject to any disclaimer, the term of this patent is extended or adjusted under 35 U.S.C. 154(b) by 71 days.

(21) Appl. No.: 16/116,448

(22) Filed: Aug. 29, 2018

(65) Prior Publication Data

US 2018/0372336 A1 Dec. 27, 2018

Related U.S. Application Data

(62) Division of application No. 13/954,809, filed on Jul. 30, 2013, now Pat. No. 10,072,851.
(Continued)

(51) Int. Cl.
*F24D 11/00* (2006.01)
*F24D 17/00* (2006.01)
(Continued)

(52) U.S. Cl.
CPC ........ *F24D 11/003* (2013.01); *F24D 17/0015* (2013.01); *F24S 10/70* (2018.05);
(Continued)

(58) Field of Classification Search
CPC . F24D 11/00; F24D 17/00; F24S 23/70; F24J 2/24
See application file for complete search history.

(56) References Cited

U.S. PATENT DOCUMENTS 4,169,554 A   10/1979   Camp
4,289,113 A    9/1981   Whittemore
(Continued)

FOREIGN PATENT DOCUMENTS

DE    19710642 A1    9/1998

OTHER PUBLICATIONS

Farid Arya et al., Current Developments in Flat-Plate Vacuum Solar Thermal Collectors, World Academy of Science, Engineering and Technology International Journal of Energy and Power Engineering, vol. 10, No. 6, 2016, pp. 715-719.
(Continued)

*Primary Examiner* — Edelmira Bosques
*Assistant Examiner* — Nikhil P Mashruwala
(74) *Attorney, Agent, or Firm* — Dorsey & Whitney LLP

(57) ABSTRACT

A building-integrated solar energy system is disclosed that comprises an evacuated closed-loop conduit network circulating a working fluid through a solar thermal collector and at least one heat usage device, wherein the effective entirety of the surfaces of the closed-loop conduit network are in contact with the working fluid such that phase change occurs whenever heat energy is added by the solar thermal collector or removed by a heat usage device. The working fluid is adiabatically isolated and contained in a low pressure environment within the closed-loop conduit network. The full surface contact and low-pressure isolation of the working fluid dramatically reduces temperature differentials and energy losses, allowing for highly efficient and cost-effective heat collection and distribution.

20 Claims, 7 Drawing Sheets

Related U.S. Application Data

(60) Provisional application No. 61/711,103, filed on Oct. 8, 2012, provisional application No. 61/701,988, filed on Sep. 17, 2012, provisional application No. 61/704,999, filed on Sep. 24, 2012, provisional application No. 61/703,113, filed on Sep. 13, 2012.

(51) Int. Cl.
| | | |
|---|---|---|
| *F24S 10/70* | (2018.01) | |
| *F24S 10/95* | (2018.01) | |
| *F24S 90/10* | (2018.01) | |
| *F24S 60/00* | (2018.01) | |
| *F03G 6/06* | (2006.01) | |
| *F24S 23/70* | (2018.01) | |
| *F24S 80/20* | (2018.01) | |
| *F28D 20/00* | (2006.01) | |

(52) U.S. Cl.
CPC ............... *F24S 10/95* (2018.05); *F24S 60/00* (2018.05); *F24S 90/10* (2018.05); *F03G 6/06* (2013.01); *F24S 23/70* (2018.05); *F24S 80/20* (2018.05); *F28D 2020/0082* (2013.01); *Y02A 30/62* (2018.01); *Y02B 10/22* (2013.01); *Y02B 10/70* (2013.01); *Y02E 10/46* (2013.01)

(56) References Cited

U.S. PATENT DOCUMENTS

| | | |
|---|---|---|
| 4,470,450 A | 9/1984 | Bizzell |
| 7,810,491 B2 | 10/2010 | Benvenuti |
| 8,182,688 B2 | 5/2012 | Simmons |
| 8,347,877 B2 * | 1/2013 | Shabtay .................. F24S 30/42 126/664 |
| 9,739,507 B2 * | 8/2017 | Wehner .............. G05D 23/1346 |
| 2011/0197878 A1 * | 8/2011 | Kuffer .................... F24S 40/58 126/624 |
| 2011/0253127 A1 | 10/2011 | Lowe et al. |
| 2015/0362219 A1 | 12/2015 | Wehner |
| 2016/0169239 A1 * | 6/2016 | Mortensen ............ F04D 27/007 126/646 |
| 2018/0266712 A1 * | 9/2018 | Plourde .................. F24S 90/00 |

OTHER PUBLICATIONS

Genersys Plc, Genersys 1450 Flat Plate Vacuum Solar Collector, The World's only panel combining the advantages of both flat plate aesthetics and vacuum technology, 2008, 2 pages.

Genersys Plc, Genersys 1850 Super Hot Flat Plate Vacuum Solar Collector, The World's only panel combining the advantages of both flat plate aesthetics and vacuum technology, intended for Industrial and Commercial use, 2008, 2 pages.

\* cited by examiner ial Application No. 61/711,103, filed
BUILDING-INTEGRATED SOLAR ENERGY SYSTEM

REFERENCE TO RELATED APPLICATIONS

This application is a divisional of U.S. patent application Ser. No. 13/954,809, filed on Jul. 30, 2013 and entitled "Building-integrated solar energy system," which claims the benefit of U.S. Provisional Application No. 61/711,103, filed on Oct. 8, 2012 and entitled "Heat exchanger," U.S. Provisional Application No. 61/701,988, filed on Sep. 17, 2012, U.S. Provisional Application No. 61/704,999, filed on Sep. 24, 2012 and entitled "Solar energy collection system," and U.S. Provisional Application No. 61/703,113 filed in Sep. 19, 2012 and entitled "Solar thermal storage tank," each of which are incorporated by reference herein.

FIELD OF THE INVENTION

The present invention relates in general to solar energy systems in which solar thermal energy is directly absorbed by a working fluid to simultaneously and reliably provide space heating, space cooling, water heating, and electricity generation to a building.

BACKGROUND

Solar thermal energy is a technology for harnessing solar energy in the form of heat. The thermal energy of solar radiation is absorbed by an absorber body in a solar thermal collector in which a working fluid is heated by the absorber body and circulated between the solar thermal collector and the end use. Traditional solar thermal systems are specifically used in either power plant electricity generation, hot water heating, or space heating and cooling. However, due to the current designs of available solar thermal technology, a solar thermal system that concurrently provides all of the above services to a residential or commercial building (essentially a "net-zero building") does not exist.

The primary limitation with existing solar thermal systems is a conflict between two properties. The first property being that solar thermal systems are most efficient when its solar collectors operate at ambient temperature, that is, the hotter a solar collector gets above ambient, the more heat energy it loses to the environment via conduction, convection, and radiation. This directly opposes with the second property being that the working fluid inside the solar thermal collector must be at a greater temperature than that of the end use for heat to move in the desired direction. As a result, a contradiction occurs being that having a high solar collector temperature is required for collecting more usable heat energy, yet a higher solar collector temperature also means losing more heat energy. Therefore, existing solar thermal systems are extremely inefficient at high temperature differentials, meaning that they are unable to provide a building with enough energy to completely satisfy its needs.

SUMMARY

In one embodiment, the present invention provides for a solar energy system for collecting and distributing heat energy from the sun into a building for usage comprising a closed-loop conduit network whose entire inner surface is in contact with a working fluid such that any substantial temperature differentials of the working fluid become negligible across the system, wherein the closed-loop conduit network is evacuated to a pressure such that the working fluid experiences phase change whenever heat energy is added or removed, an impermeable housing enveloping the closed-loop conduit network and forming a high vacuum located between and defined by the outer surface of the closed-loop conduit network and the inner surface of the impermeable housing such that the working fluid is adiabatically isolated inside the closed-loop conduit network, a solar thermal collector whose enclosure seals a portion of the evacuated space inside such that the enclosure forms a portion of the impermeable housing, the solar thermal collector further containing a solar absorber thermally coupled to a heat transfer interface, a heat exchanger connected in parallel to the heat transfer interface and located inside a thermal storage tank containing a thermal mass for storing heat energy, an absorption chiller connected in parallel to the heat exchanger and coupled with a fan coil unit to provide space cooling, an air heat exchanger for providing space heating and connected in parallel to the absorption chiller, and a heat engine coupled with a generator to provide electricity and connected in parallel to the air heat exchanger, whereby the working fluid received by the heat transfer interface obtains heat energy from the solar absorber, evaporates, and flows through either: the heat exchanger, the absorption chiller, the air heat exchanger, or the heat engine; at which the working fluid releases heat energy, condenses, and collects at a liquid reservoir, wherein a pump connected in series to the liquid reservoir propels the condensed working fluid towards the solar thermal collector and into the heat transfer interface to begin a new cycle.

In another embodiment, a method for transporting heat energy by liquid-vapor phase change of a working fluid is disclosed. The method includes providing a closed-loop conduit network connecting a heat source and a heat destination, wherein an impermeable housing encloses the closed-loop conduit network forming an insulating space located between and defined by an outer surface of the closed-loop conduit network and an inner surface of the impermeable housing; evacuating the insulating space such that the working fluid is thermally isolated inside the closed-loop conduit network; evacuating the closed-loop conduit network to create a vacuum environment therein at a predetermined pressure; and filling the vacuum environment with the working fluid such that the working fluid is in full contact with an inner surface of the closed-loop conduit network, whereby the working fluid absorbs heat energy at the heat source, evaporates, flows toward and through the heat destination, at which the working fluid releases heat energy, and condenses to complete the cycle. The full contact with the inner surface of the closed-loop conduit network, thermal isolation, and phase change of the working fluid minimizes heat energy losses to an outside environment and eliminates any substantial temperature differentials within the closed-loop conduit network.

In yet another embodiment, a method for transporting heat energy by liquid-vapor phase change of a working fluid is disclosed. The method includes providing a closed-loop conduit network connecting a heat source and a heat destination; evacuating the closed-loop conduit network to create a vacuum environment therein at a predetermined pressure; and filling the vacuum environment with the working fluid such that the working fluid is in full contact with an inner surface of the closed-loop conduit network, whereby the working fluid absorbs heat energy at the heat source, evaporates, flows toward and through the heat destination, at which the working fluid releases heat energy, and condenses to complete the cycle. The full contact with the inner surface of the closed-loop conduit network and phase change of the working fluid minimizes heat energy losses to an outside environment and eliminates any substantial temperature differentials within the closed-loop conduit network.

In an additional embodiment, a method for converting solar energy into power for one or more devices is disclosed. The method includes receiving, by a solar thermal collector, solar radiation; converting, by the solar thermal collector, the solar radiation into heat energy within a closed-loop system comprising a vacuum environment and a working fluid; transferring, by the solar thermal collector, the heat energy to the working fluid causing evaporation of the working fluid to a vapor; and transporting, by a conduit, the vapor comprising the heat energy through the closed-loop system to a heat usage device; transferring the heat energy to the heat usage device causing condensation of the vapor to the working fluid. The closed-loop conduit network may have substantially consistent temperature throughout and minimizes heat energy loss to an outside environment.

The present invention addresses the inefficiency problem in existing solar thermal systems by possessing several features to minimize temperature differentials. First, the full surface contact with the working fluid in conjunction with phase change brings temperature differentials across the system down to almost nothing, increasing efficiency. This allows the system to accumulate more solar heat energy while staying at a reduced overall temperature. In addition, phase change reduces energy consumption because the energy required to change a liquid to a gas (or vice versa) is many times higher than the energy required to heat a liquid or gas a few degrees. In addition the energy required to move the vapor comes from the solar energy source, and so requires no pump. Finally, the impermeable outer housing provides a vacuum insulation to greatly reduce heat energy lost from conduction and convection. This allows the solar thermal system to operate more efficiently at higher temperatures above ambient. The impermeable outer housing also makes the system extremely cost effective because it prevents exposure of the closed-loop conduit network to the outside environment, thereby eliminating the need for pressure resistant material in its members and the risk of corrosion. The resulting high efficiency and cost-effectiveness of the solar energy system allows it to provide a building with space heating, space cooling, hot water, electricity, and energy storage simultaneously.

BRIEF DESCRIPTION OF THE DRAWINGS

The present invention and its advantages will be better understood by referring to the following detailed description and the attached drawings in which.

DETAILED DESCRIPTION OF THE DRAWINGS

In the following description, the use of "a", "an", or "the" can refer to the plural. All examples given are for clarification only, and are not intended to limit the scope of the invention.

Figure 1:
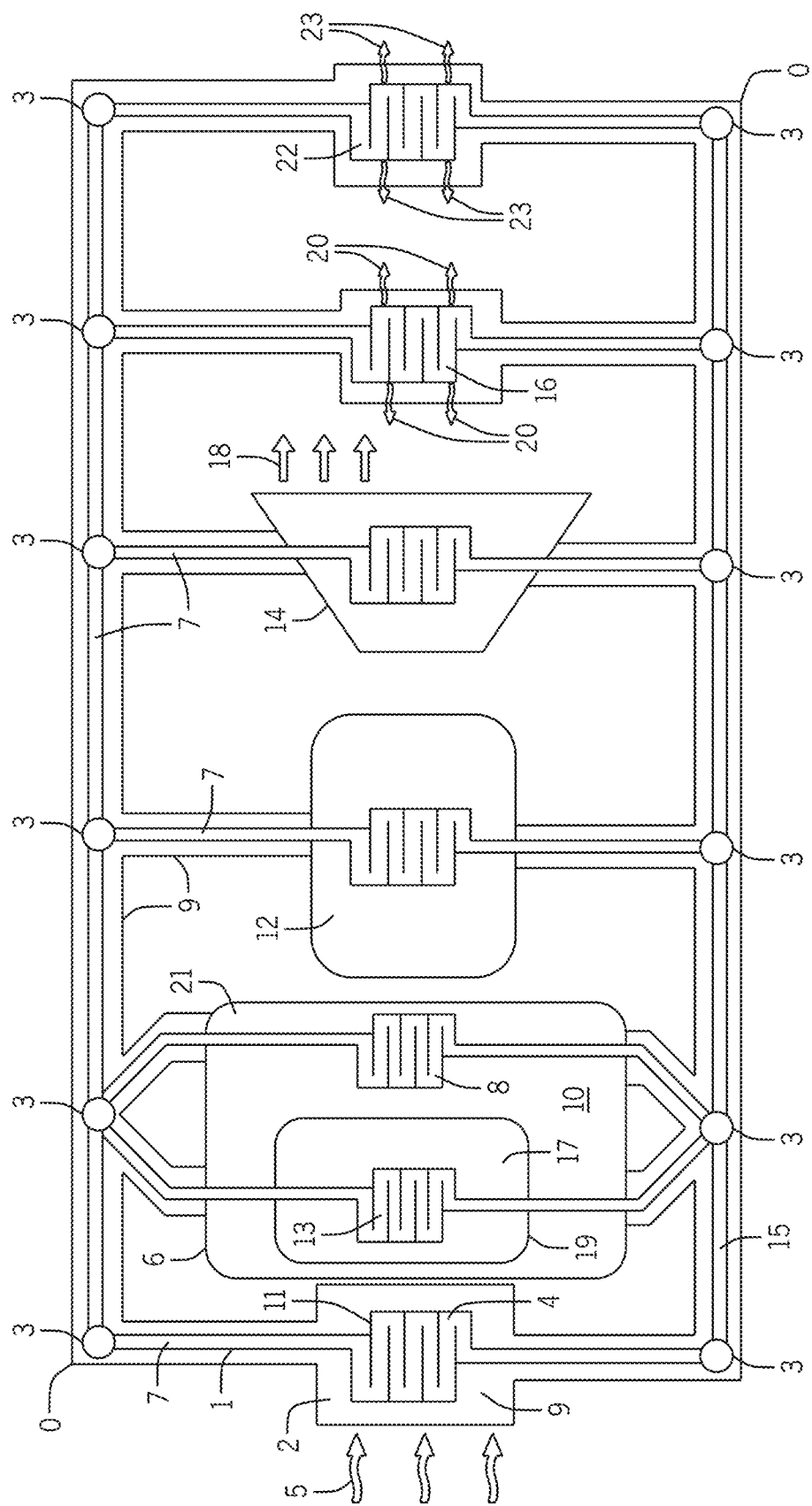
FIG. 1 shows a schematic view of one embodiment of a solar energy system described herein.

Referring to FIG. 1, according to a preferred embodiment, a solar energy system includes a closed-loop conduit network 1 that is evacuated to a predetermined pressure and filled with a working fluid 7 such that the effective entirety of the surfaces of the closed-loop conduit network 1 are in contact with the working fluid 7. The low-pressure isolation of the working fluid 7 causes evaporation whenever heat energy is added and condensation whenever heat energy is removed. As a result, temperature differentials of the working fluid 7 become essentially nothing, allowing for highly efficient heat distribution. An outer impermeable housing 0 surrounds the closed-loop conduit network 1, forming an evacuated space 9 located between and defined by the inner surface of the outer impermeable housing 0 and the outer surface of the closed-loop conduit network 1. The inner surface of the outer impermeable housing 0 comprises layers of radiation shielding. As a result, the working fluid 7 is adiabatically isolated and the closed-loop conduit network 1 members are not exposed to the outside environment, thereby eliminating the need for pressure (compressive) resistant material and the risk of corrosion.

Figure 4:
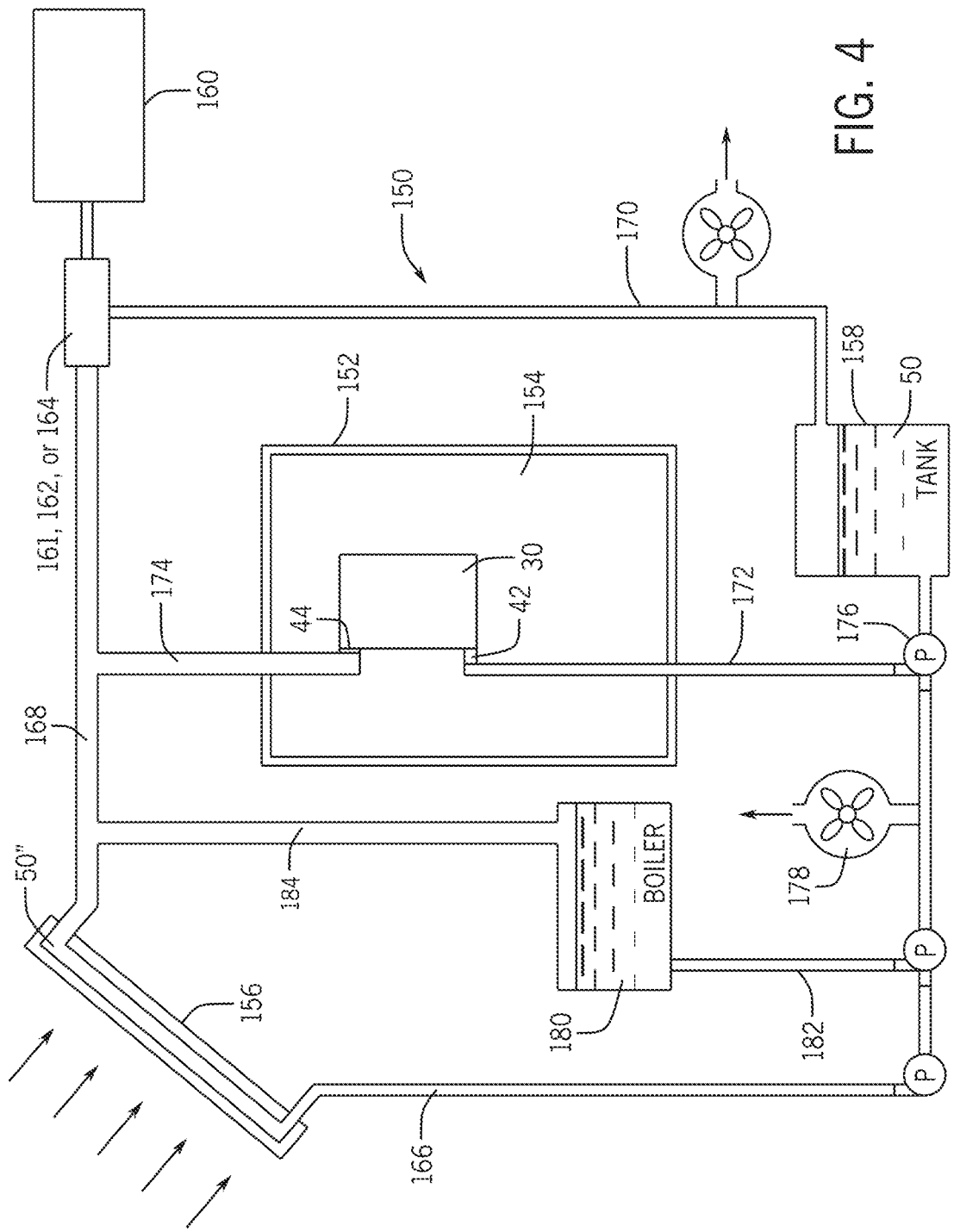
FIG. 4 shows a schematic view of an embodiment of a solar energy system with the heat exchanger of FIGS. 2 and 3.
Figure 7:
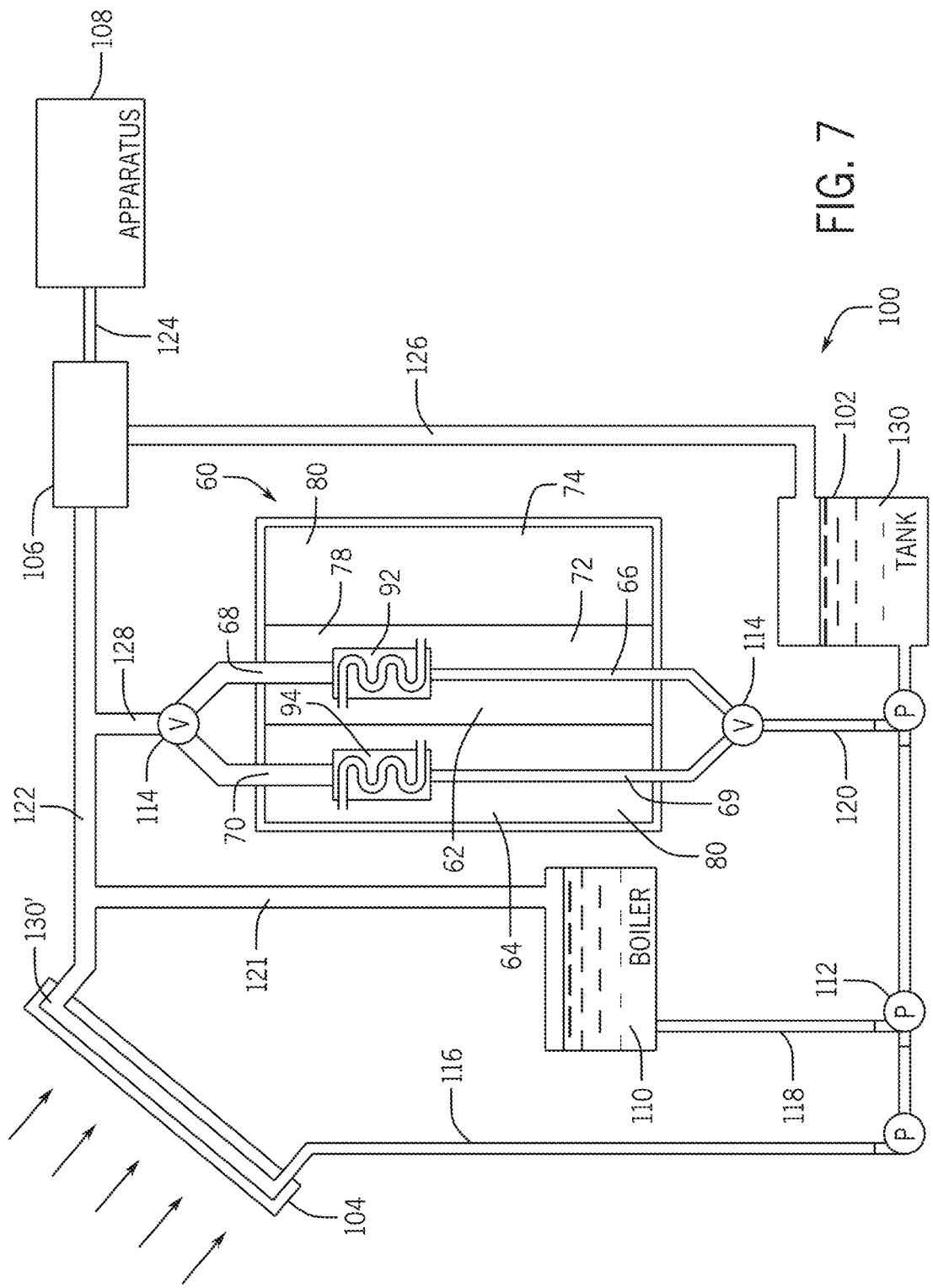
FIG. 7 shows a schematic view of an embodiment of a solar energy system with the thermal storage tank of FIGS. 5 and 6.
Figure 8:
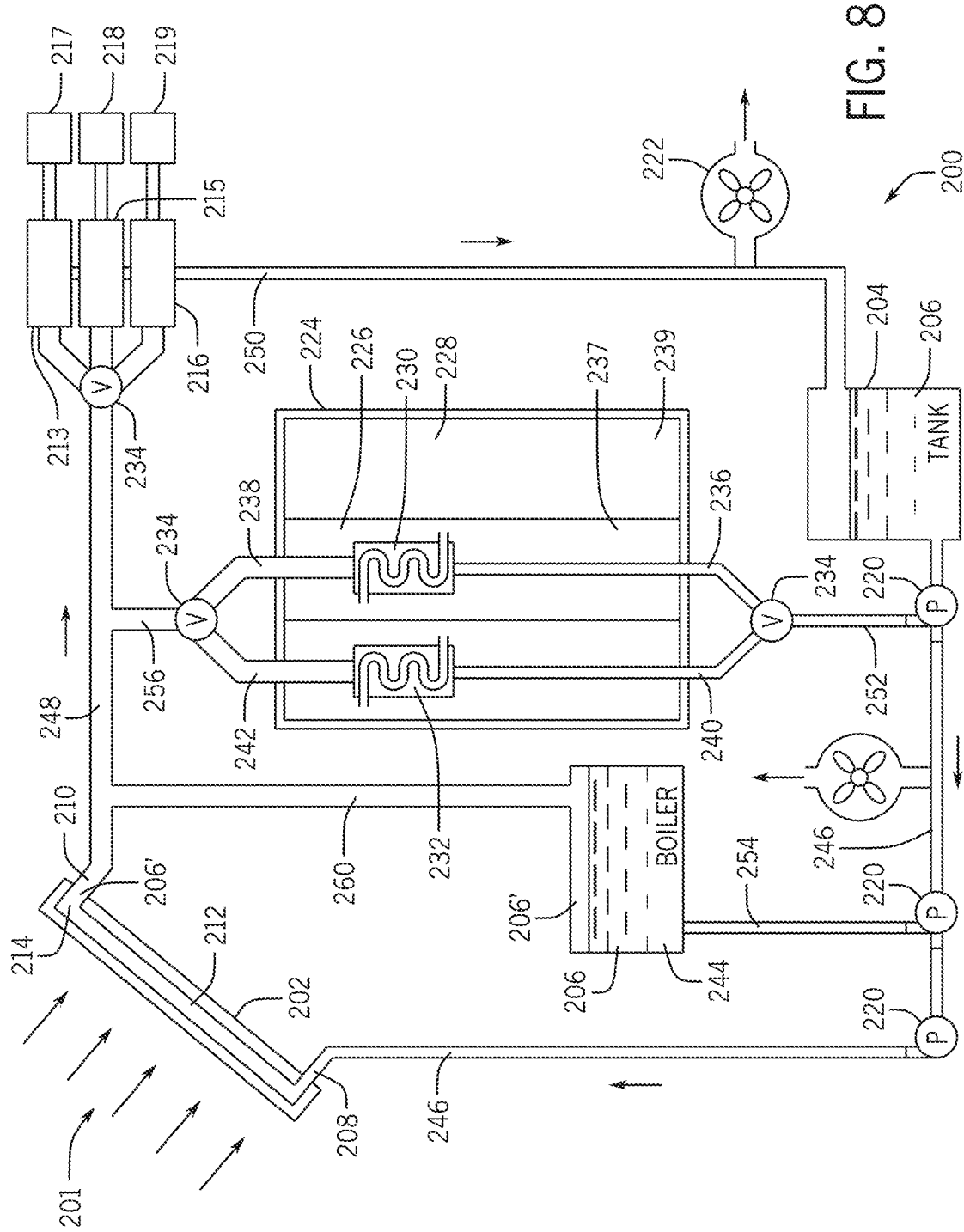
FIG. 8 shows a schematic view of an embodiment of a solar energy collection system of the present disclosure.

As shown in FIG. 1, the closed-loop conduit network 1 connects the following heat transfer devices in parallel: a heat transfer interface 4 coupled with a solar absorber 11 located inside a solar thermal collector 2, a first heat exchanger 8 located inside an outer compartment 21 of a thermal storage tank 6, a second heat exchanger 13 located inside an inner compartment 19 of the thermal storage tank 6, a heat engine 14, an air heat exchanger 16, an absorption chiller 12, and a hot water heat exchanger 22. The outer compartment 21 contains a first thermal mass 10. The inner compartment 19 contains a second thermal mass 17. The enclosure forming the solar thermal collector 2 connects to the outer impermeable housing 0 such that the space inside is a part of the evacuated space 9. The heat engine 14 is coupled with a generator to generate electricity. The absorption chiller 12 may be associated with a fan-coil unit (not shown) to provide cool air to a space. The hot water heat exchanger 22 is configured to heat potable water supplied by building's water mains. A plurality of control points 3 are configured to control flow direction of the working fluid 7. A liquid reservoir 15 is configured to collect and store excess working fluid 7. As shown, the liquid reservoir 15 may be contained within one or more conduits in the conduit network 1. The liquid reservoir 15 may be isolated from the other components within the system by one or more control points 3. In an alternate embodiment, the liquid reservoir 15 may be contained within a separate tank fluidly coupled to the conduit network 1, as shown in FIGS. 4, 7, and 8.

The closed-loop conduit network 1 circulates the working fluid 7 in an environment with an absolute pressure, of materials other than the working fluid, that is lower than the vapor pressure of the working fluid 7 at 0 degrees Celsius. The absolute pressure is preferably 1 to 1000 milliTorr. The working fluid 7 can be any fluid, preferably propylene glycol due to its low freezing point, appropriate vapor pressure and low toxicity. Both the first thermal mass 10 and second thermal mass 17 can be water, but the second thermal mass 17 is preferably a compound that changes from a solid to a liquid at a predetermined storage temperature. The second thermal mass 17 is stored inside the inner compartment 19 at a higher temperature than that of the first thermal mass 10, preferably at 150 degrees Celsius.

The control points 3 can have the form of either valves or pumps. The solar thermal collector 2 can be any device in which solar energy is absorbed by a working fluid, preferably a flat plate solar thermal collector. The solar absorber 11 is preferably a low emissivity selective coating. The heat engine 14 can also be a turbine-generator to directly generate electricity using heat energy. The absorption chiller 14 can also be configured to provide space heating. The thermal storage tank 6 rests at a lower location than all other heat transfer devices for gravity-induced flow purposes:

The heat transfer interface 4 is preferably configured such that an inlet at which the liquid state of the working fluid 7 enters is at a lower elevation than an outlet at which the vapor state of the working fluid 7 exits to inhibit reverse flow. The first heat exchanger 8 is preferably configured such that an inlet at which the vapor state of the working fluid 7 enters is at a higher elevation than an outlet at which the liquid state of the working fluid 7 exits to inhibit reverse flow. The second heat exchanger 13 is preferably configured such that an inlet at which the vapor state of the working fluid 7 enters is at a higher elevation than an outlet at which the liquid state of the working fluid 7 exits to inhibit reverse flow. The air heat exchanger 16 is preferably configured such that an inlet at which the vapor state of the working fluid 7 enters is at a higher elevation than an outlet at which the liquid state of the working fluid 7 exits to inhibit reverse flow. The hot water heat exchanger 22 is preferably configured such that an inlet at which the vapor state of the working fluid 7 enters is at a higher elevation than an outlet at which the liquid state of the working fluid 7 exits to inhibit reverse flow.

The solar thermal collector 2 acts as an evaporator by absorbing solar radiation 5 into solar absorber 11 and transferring heat energy into working fluid 7. The working fluid 7 changes into vapor form and is transported to at least one of the following heat usage devices: the first heat exchanger 8, the second heat exchanger 13, the air heat exchanger 16, the hot water heat exchanger 22, the absorption chiller 12, the heat engine 14, and any combination thereof depending on the end use energy needs. The heat usage devices act as condensers, wherein upon contact with the working fluid 7, the working fluid 7 in vapor form condenses into a liquid state by either releasing heat energy to the first thermal mass 10 via the first heat exchanger 8, releasing heat energy to the second thermal mass 17 via the second heat exchanger 13, releasing heat energy 20 to heat air in a space via the air heat exchanger 16, releasing heat energy 23 to heat potable water via hot water heat exchanger 22, supplying heat energy to the heat engine 14 to generate mechanical energy 18, or supplying heat energy to the absorption chiller 12 to cool a space. The working fluid 7 in liquid form is collected in the liquid reservoir 15 and pumped back into the solar thermal collector 2 to continue the process. Waste heat energy from the heat engine 14 or absorption chiller 12 can be recovered into the thermal storage tank 6 by redirecting flow of the working fluid 7 into the first heat exchanger 8, thereby transferring the waste heat energy into the first thermal mass 10.

At night, when insufficient solar radiation 5 is present, control points 3 redirect flow of the working fluid 7 such that the second heat exchanger 13 acts as the evaporator. A differential thermostat can be used to detect and initiate this process. Heat energy is collected and stored inside the second thermal mass 17 during the day so that during night time, when there is a need for energy, the second thermal mass 17 releases heat energy into the working fluid 7 via the second heat exchanger 13, causing working fluid 7 to evaporate into a vapor state. The working fluid 7 is then transported to at least one of the following heat usage devices: the first heat exchanger 8, the absorption chiller 12, the heat engine 14, and any combination thereof depending on the end use energy needs. Upon contact with any of the heat usage devices, the working fluid 7 in vapor form condenses into liquid form by either releasing supplying heat energy to the first thermal mass 10 in the outer compartment 21 via the first heat exchanger 16, supplying heat energy to the heat engine 14 to generate mechanical energy 18 and subsequently electricity, or supplying heat energy to the absorption chiller 12 to cool a space with a cooling load. The working fluid 7 in liquid form then flows back into the thermal storage tank 6 to continue the process.

Heating air and potable water does not require an extremely high temperature heat source, therefore, when space heating or hot water is required at night, control points 3 redirect flow of the working fluid 7 such that the first heat exchanger 8 acts as the evaporator. Heat energy is collected during the day and stored inside the first thermal mass 10 so that the first thermal mass 10 releases heat energy into the working fluid 7 via the first heat exchanger 8, causing the working fluid 7 to evaporate into a vapor state. The working fluid 7 is then transported to either the hot water heat exchanger 22 or the air heat exchanger 16 depending on the energy need, wherein upon contact, the vapor state of working fluid 7 condenses into a liquid state by either releasing heat energy 23 to the potable water supplied by a building's water mains via the hot water heat exchanger 22 or releasing heat energy 20 to the air in a space with a heating load via the air heat exchanger 16. The working fluid 7 in liquid form is collected in the liquid reservoir 15 and flows back into the thermal storage tank 6 to continue the process.

Figure 2:
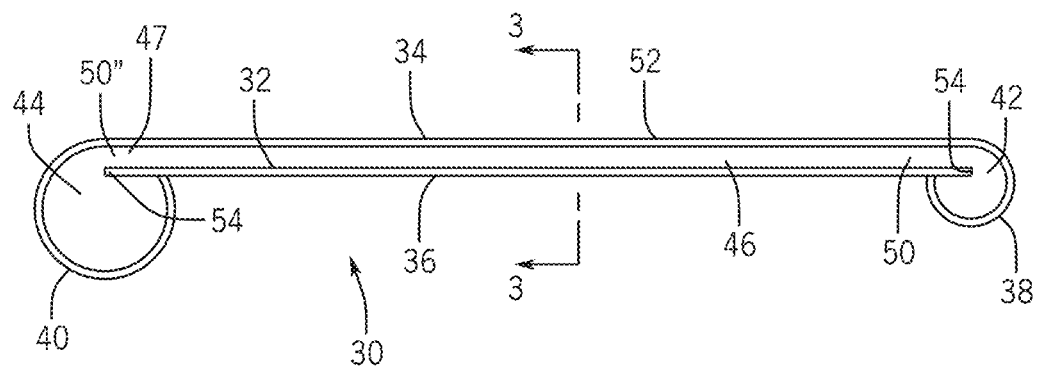
FIG. 2 is a side view of one embodiment of a heat exchanger that may be used within the solar energy system of FIG. 1.
Figure 3:
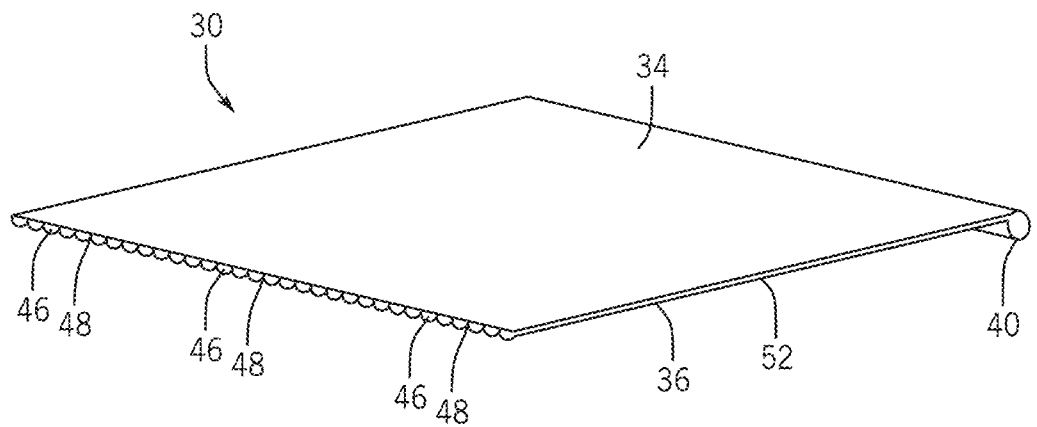
FIG. 3 is a perspective view showing a cross-section of the heat exchanger of FIG. 2 taken along line 3-3.

FIGS. 2 and 3 show one embodiment of a heat exchanger 30 that may be used within the closed-loop conduit network. One or both of the heat exchangers 8, 13 of FIG. 1 may be similar to the heat exchanger 30 depicted in FIGS. 2 and 3. As shown, the heat exchanger 30 may comprise a pair of manifolds 38 and 40, spaced apart and bridged by a heat exchanger plate 52. The heat exchanger plate 52 may comprise a top sheet 34 and a bottom sheet 36. The top sheet 34 and the bottom sheet 36 may be laminated to form a plurality of parallel fluid channels 46 extending along the length of the plate 52. The top sheet 34 may be a flat plate member that is arranged parallel to the bottom sheet 36. The bottom sheet 36 may be molded to comprise a plurality of parallel fluid channels 46 adjacent to each other for circulating a heat exchange fluid 50 through the heat exchanger 30. The fluid channels 46 may be any oblong cross-sectional shape that is sufficient to transfer fluid 50 through the heat exchanger 30. In practice, fluid channels 46 are best configured to be semicircular in cross-section, as shown in FIG. 3. The semicircular cross-section provides the best resistance against internal and external forces that can cause deformation to plate 52. However, fluid channels 46 configured in semi-elliptical cross-section can be sufficient as well. Additionally, the fluid channels 46 can be spaced apart such that there is a distance of approximately 1 centimeter or less in between an edge 48 of each fluid channel 46, as illustrated in FIG. 3. In practice, a distance of approximately 0 to 0.25 centimeter is preferred. The fluid channels 46 can be of any radius that is commensurate with the overall dimensions of the heat exchanger 30. Preferably, a radius of 1 centimeter or greater has been found to be sufficient. In practice, a radius between approximately 1 to 2 centimeters may be used. The design and configuration of the top sheet 34 and the bottom sheet 36 allow fluid 50 therein to be in contact with approximately 100% of an interior surface 32 of heat exchanger 30. A high contact percentage can allow for the lowest possible temperature differential between the fluid 50 and the heat exchanger 30. Additionally, a high contact percentage can allow the use of lower conductive, low cost and low energy input materials with approximately no increase in temperature differential from the temperature of the heat exchanger 30 to the fluid 50. In practice, a contact percentage of approximately 80% to 100%, preferably 90% to 95%, is sufficient to achieve the desired configuration of the present embodiment.

The manifolds 38 and 40 are attached at opposite ends 54 of the plate 52 to allow fluid 50 and 50" to enter and exit the heat exchanger 30. The manifolds 38 and 40 can be of any type that are capable of transporting fluid 50 and 50" to and from the plate 52. In practice, the top sheet 34 has the same width as the bottom sheet 36 and a larger length than the bottom sheet 36. The larger length allows the ends of the top sheet 34 to be bent and attached to the surface of the bottom sheet 36 to form the supply manifold 38 and the return manifold 40, as illustrated in FIG. 2. As shown, the return manifold 40 is larger than the supply manifold 38. This is because the supply manifold 38 is configured to receive a liquid fluid 50 and the return manifold 40 is configured to return a vapor fluid 50". The manifolds 38 and 40 can be any oblong cross-sectional shape that is sufficient to transfer fluid 50, 50" through the heat exchanger 30. In practice, it has been found that the manifolds 38 and 40 are best configured to be circular or square in cross-section. A plethora of combinations of assembling manifolds 38 and 40 would be apparent to one skilled in the art. For example, pre-assembled manifolds 38 and 40 not assembled from bending top sheet 34 can be assembled and attached to the opposite ends 54 of plate 52.

In operation, liquid fluid 50 enters an inlet conduit 42 in fluid communication with the supply manifold 38. Liquid fluid 50 fills up the chamber within the supply manifold 38 and enters the fluid channels 46 within the plate 52. An exterior heat source (e.g., from the thermal mass 10, 17 of the thermal storage tank 6 of FIG. 1) transfers heat, by way of conduction, to heat liquid fluid 50 causing liquid fluid 50 to boil into a vapor liquid 50" within a vapor-phase zone 47 located at the upper end of plate 52. The boiling temperature of fluid 50 will be dependent on each type of fluid. For example, if water is used, then the boiling temperature will be approximately 100 degrees Celsius. Vapor fluid 50" exits the vapor-phase zone 47 and enters return manifold 40 where it exits heat exchanger 30 by outlet conduit 44 in fluid communication with return manifold 40. Additionally, the heat exchanger 30 can operate in reverse. For example, vapor fluid 50" may enter outlet conduit 44 in fluid communication with the return manifold 40. The vapor fluid 50" fills up the chamber defined within return manifold 40 and enters fluid channels 46 within the plate 52. Heat from vapor fluid 50" transfers, by way of conduction, to an exterior fluid surrounding the heat exchanger 30 (e.g., the thermal mass 10, 17 contained within compartments 19, 21 of the thermal storage tank 6 of FIG. 1) causing the vapor fluid 50" to condense back into a liquid fluid 50. The liquid fluid 50 enters an inlet conduit 42 in fluid communication with the supply manifold 38. Liquid fluid 50 fills up the chamber defined by the supply manifold 38 and enters fluid channels 46 within the plate 52. The liquid fluid 50 exits the heat exchanger 30 by inlet conduit 42 in fluid communication with the supply manifold 38 to return back to the liquid reservoir 15.

The heat exchanger 30 can be of any size that is capable of performing the functions as previously described. In practice, it has been found that a width of approximately 1 meter and a length of 2 meters is sufficient. It is also contemplated that the heat exchanger 30 may comprise a plurality of smaller heat exchangers combined. As one example, four smaller heat exchangers with a width of 0.25 meter and length of 2 meters can be arranged to form an array of heat exchangers with a width of 1 meter and length of 2 meters. In this example, each heat exchanger comprising the heat exchanger 30 may be in fluid communication with one another. The heat exchanger 30 may be assembled from any suitable material which can withstand the operating temperature thereof and efficiently conduct heat. A plethora of materials exist that are suitable, such as, for example, stainless steel, plastic or fiberglass. Propylene glycol may be used for fluid 50 and 50" since it has a higher boiling temperature and lower corrosion rate than other fluids such as water. Alternatively, other fluids, such as water, can be a comparable substitute.

In an alternate embodiment, the heat exchanger 30 may include a screen mesh (not shown) positioned between the top sheet 34 and the bottom sheet 36. The screen mesh may comprise an arrangement of interlocking wires or rods with evenly spaced and uniform small gaps defining the structure of the screen mesh. The gaps may provide fluid channels that extend along the length of the plate 52. With the screen mesh, the heat exchanger 30 may be able to accommodate more external pressure than without the screen mesh, since the screen mesh may act as a support to better resist against external forces that can cause deformation of the plate 52.

In an alternate embodiment of the solar energy system of the present disclosure, the system may include a storage tank with a single heat exchanger. FIG. 4 shows an alternate embodiment of a solar energy system 150 including a storage tank 152 with the heat exchanger 30 of FIGS. 2 and 3. In this embodiment, the solar energy system 150 may also include a source tank 158, one or more pumps 176, one or more vacuum pumps 178 (see, e.g., FIG. 8 below), and a boiler 180. The solar energy collection system 150 operates by pumping liquid fluid 50 from the source tank 158 to the solar collector 156 via a conduit 166. The solar collector 156 heats liquid fluid 50 causing it to boil into a vapor fluid 50". Vapor fluid 50" exits the solar collector 156 via a conduit 168 where heat from vapor fluid 50" is used to power an apparatus 160 through a heat exchanger 161, heat engine 162 or absorption chiller 164. The vapor fluid 50" condenses back into source liquid fluid 50 and returns back to the source tank 158 via a conduit 170. Excess vapor fluid 50" can be redirected to heat storage tank 152 via a conduit 174. The storage tank 152 contains therein the heat exchanger 30 and a tank fluid 154. The tank fluid 154 can be any fluid that is sufficient to store and transfer heat, such as water or a salt. Vapor fluid 50" enters the outlet conduit 44 in fluid communication with the return manifold 40. The vapor fluid 50" fills up the chamber within the return manifold 40 and enters fluid channels 46 within the plate 52. Heat from the vapor fluid 50" transfers by way of conduction to tank fluid 154 causing the vapor fluid 50" to condense back into a liquid fluid 50. The liquid fluid 50 enters the supply manifold 38 where it exits the heat exchanger 30 by the inlet conduit 42 in fluid communication with the supply manifold 38 to return back to the source tank 158.

When insufficient solar radiation is present, liquid fluid 50 may be pumped to the storage tank 152 via a conduit 172. Within the storage tank 152, the heat exchanger 30 operates by transferring heat from the tank fluid 154 to heat the liquid fluid 50 into vapor fluid 50". The vapor fluid 50" exits the heat exchanger 30 via the conduit 174 and is transported to conduit 168 where heat from vapor fluid 50" can be used to power apparatus 160 via heat exchanger 161, heat engine 162 or absorption chiller 164.

As an alternative, when insufficient solar radiation is present, source liquid fluid 50 may be pumped to a boiler 180 via a conduit 182. The boiler 180 can be heated by a variety of methods, for example, by natural gas or propane. The boiler 180 heats the source liquid fluid 50 into source vapor fluid 50". The source vapor fluid 50" exits the boiler 180 via a conduit 184 and is transported to conduit 168 where heat from vapor fluid 50" can be used to power apparatus 160 via heat exchanger 161, heat engine 162 or absorption chiller 164. When the heat is used, the source vapor fluid 50" condenses back into source liquid fluid 50. The source liquid fluid 50 returns back to the source tank 158 via conduit 170.

Figure 5:
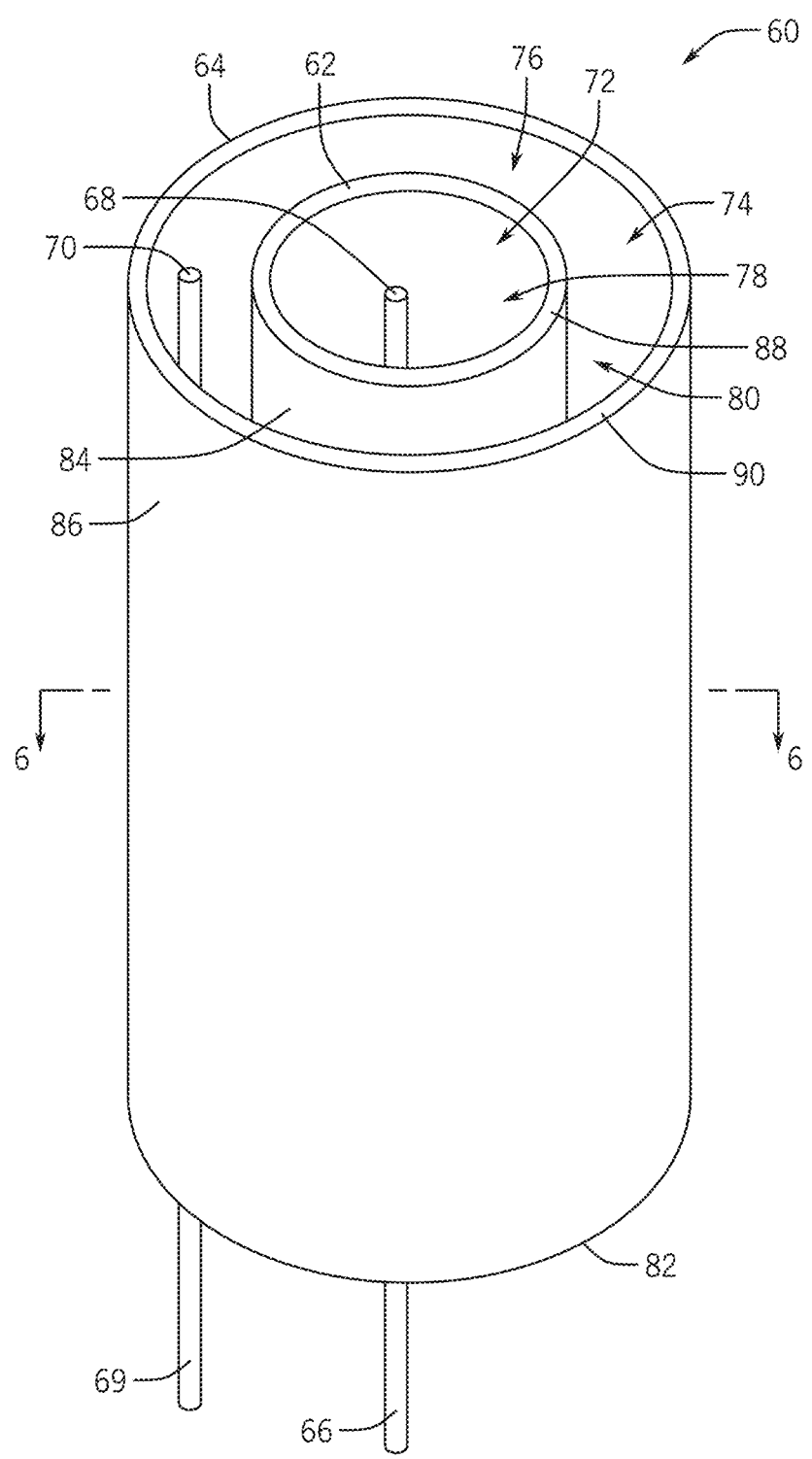
FIG. 5 is a perspective view of one embodiment of a thermal storage tank that may be used within the solar energy system of FIG. 1.
Figure 6:
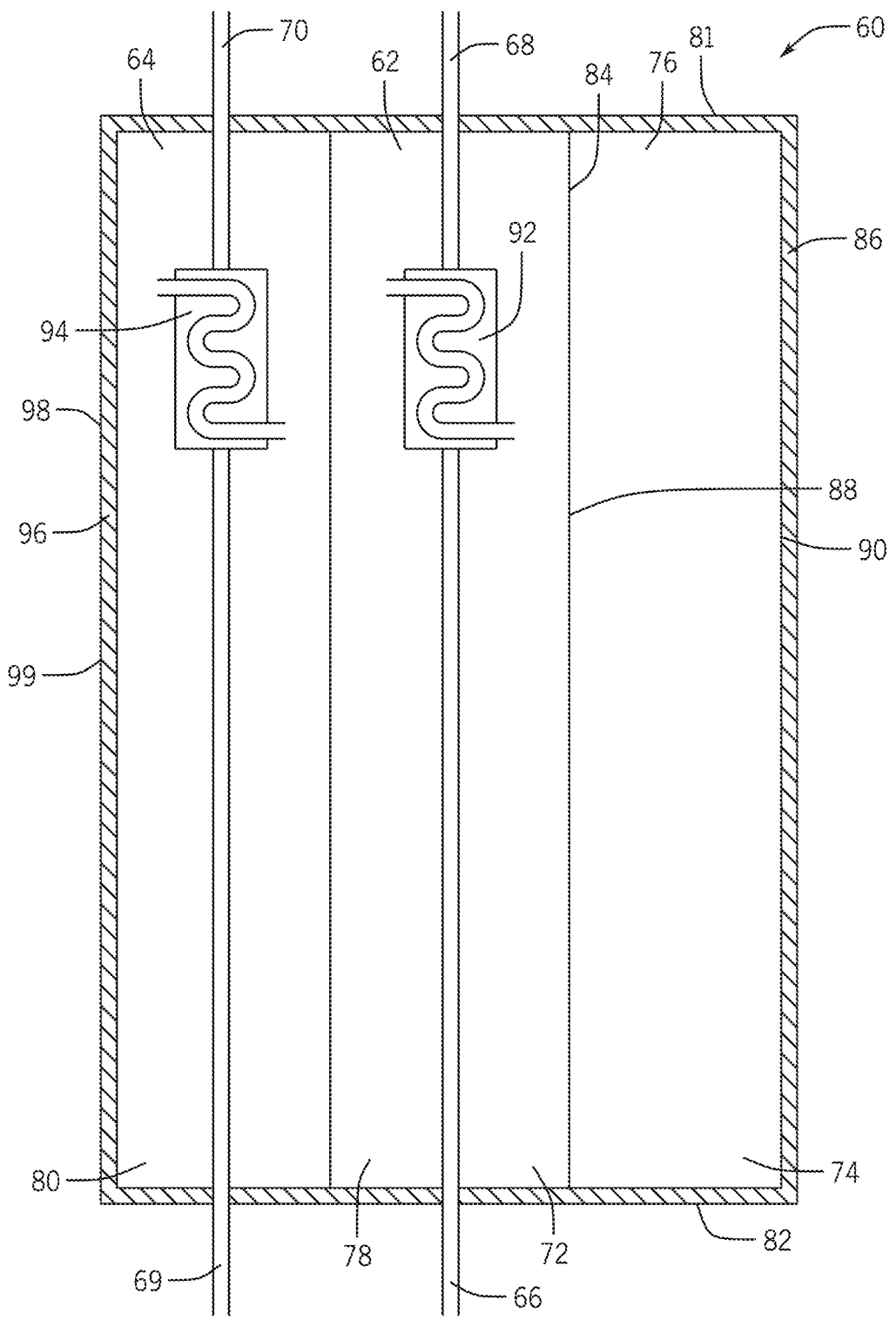
FIG. 6 is a cross-sectional view of the thermal storage tank of FIG. 5 taken along line 6-6.

FIGS. 5 and 6 show one embodiment of a thermal storage tank that may be used within the closed-loop conduit network. The thermal storage tank 6 of FIG. 1 may be similar to the tank 60 depicted in FIGS. 5 and 6. In the depicted embodiment, the thermal storage tank 60 may be in the shape of a circular cross-section tank. The tank 60 may be connected by conduits and configured to store a fluid. The tank 60 has an enclosure wall 99 that may comprise thermal insulation 96. For example, the thermal insulation 96 may be polyurethane foam. The enclosure wall 99 may surround at least two compartments 72 and 74 for the storage of different fluids 78 and 80. The tank 60 may be evacuated to a pressure of 1-1000 micron, which results in the tank 60 being vacuum insulated such that the tank 60 contains only fluids 78, 80. The tank 60 comprises a first member 62 and a second member 64. The first member 62 is shown as a circular cross-section tank arranged coaxially within the second member 64. The second member 64 is shown as another circular cross-section tank arranged coaxially and radially around first member 62. The tank 60 and members 62, 64 are preferably a cylindrical shape, which provides a practical configuration to achieve a high volume to surface area ratio; however, it is contemplated that the tank 60 and members 62, 64 may be of any shape. The first member 62 comprises a first member wall 84 enclosing a first compartment 72 for the storage of a first fluid 78 therein. The second member 64, arranged coaxially and radially around the first member 62, comprises a second member wall 86 enclosing a second compartment 74 for the storage of a second fluid 80 therein. The compartments 72 and 74 are separated by a first member wall 84. The first member wall 84 may include flap valves (not shown) to allow the exchange and passage of fluids 78, 80 between the compartments 72 and 74; however, other methods are contemplated to allow the exchange and passage of fluids 78, 80 between the compartments 72, 74. By allowing the exchange and passage of fluids 78, 80 between the compartments 72 and 74, the quantity of fluid 78, 80 directed to each heat exchanger 92, 94 can be controlled so that the first fluid 78 in the first compartment 72 is a higher temperature than the second fluid 80 in the second compartment 74. The arrangement of members 62 and 64 defines a clearance 76 therebetween. The first member 62 has a first diameter 88 that can be any size that is less than a diameter 90 of the second member 64. In practice, it is envisioned that first member diameter 88 can be approximately 8 to 12 feet. Preferably, the first diameter 88 can be approximately 10 to 11 feet. The second member diameter 90 is proportional to the length of the clearance 76 between the first and second member walls 84 and 86. The clearance 76 has a radial clearance length of approximately 30 to 50% of the first member diameter 88. Preferably, the clearance 76 can have a radial clearance length of approximately 35 to 45% of first member diameter 88. The total volume of tank 60 can be approximately 5,000 to 10,000 gallons, for a single family home, with the volume of the first member 62 preferably being 20 to 30% of the total volume of the tank 60; however, the tank 60 can be smaller or larger depending on the amount of heat needed to be stored at a higher temperature.

A first inlet conduit 66 is attached to a bottom plate 82 of tank 60 and extends to attach to a first heat exchanger 92 located within the first member 62. A first outlet conduit 68 is attached to the first heat exchanger 92 and extends through a top plate 81 of tank 60. A second inlet conduit 69 is attached to the bottom plate 82 of tank 60 and extends to attach to a second heat exchanger 94 located within the second member 64. A second outlet conduit 70 is attached to the second heat exchanger 92 and extends through the top plate 81 of the tank 60. A suitable pump 112 pumps a source fluid 130 to be heated by the fluids 78 and 80 within the tank 60.

The tank 60 can be constructed through a variety of methods. As one example, the tank 60 may be assembled at an offsite location, and the final product may be transported to a desired destination to be configured with a solar energy system. A problem with this method is the cost of shipping tank 60 and potential configuration problems associated with the solar energy system. As another example, the components of the tank 60 may be transported to the desired destination and the tank 60 may be assembled on site. This method can potentially lessen cost and reduce configuration problems associated with the solar energy system. In practice, it may be preferable to assemble the tank 60 on site. The tank 60 may be positioned in any desired location. For example, the tank 60 may be positioned inside the basement or backyard of a house. In practice, it may be preferable to position the tank 60 underground. The tank 60 may be constructed of any material that is structurally sound, resistant to corrosion, and sufficiently impermeable to hold a vacuum. For example, the tank 60 may be constructed of stainless steel and/or concrete.

FIG. 7 shows an alternate embodiment of a solar energy system 100 of the present disclosure including the thermal storage tank 60 of FIGS. 5 and 6. In this embodiment, the solar energy system 100 may also include a source tank 102, one or more pumps 112, and a boiler 110. Prior to filling the fluid passages with a heat transfer fluid, all fluid passages in the solar energy system 100 are first evacuated to a pressure of 1-1000 micron so that the fluid passages contain only phase change fluid. A source liquid fluid 130 may be stored in the source tank 102 for later use within the system 100.

In operation, the source liquid fluid 130, preferably propylene glycol, from the source tank 102 enters a solar collector 104 via a conduit 116 by way of a pump 112. The solar collector 104 heats the source liquid fluid 130 into a source vapor fluid 130'. The source vapor fluid 130' exits the solar collector 104 and may enter a heat engine 106 via a conduit 122. The heat engine 106 uses the heat from the source vapor fluid 130' to power an apparatus 108, such as a shower or heater, via a conduit 124. When heat from the source vapor fluid 130' is used by the apparatus 108, the source vapor fluid 130' condenses back to source liquid fluid 130. The source liquid fluid 130 returns back to the source tank 102 via a conduit 126.

Excess source vapor fluid 130' can be redirected to heat storage tank 60 via a conduit 128. Source vapor fluid 130' enters either the first member 62 or the second member 64, as determined by a valve 114. For example, source vapor fluid 130' may enter first outlet conduit 68, pass through first heat exchanger 92, exit first inlet conduit 66 as source liquid fluid 130, and return to source tank 102. In the process, heat from the source vapor fluid 130' transfers to a first fluid 78 stored in the first member 62 via the first heat exchanger 92. As another example, source vapor fluid 130' may enter second outlet conduit 70, pass through second heat exchanger 94, exit second inlet conduit 69 as source liquid fluid 130, and return to source tank 102. In the process, heat from the source vapor fluid 130' transfers to a second fluid 80 stored in the second member 64 via the second heat exchanger 94. The heat stored in the first and second fluids 78, 80 may be used when insufficient solar radiation is present. For example, when insufficient solar radiation is present, source liquid fluid 130 can be pumped to tank 60 from source tank 130 via a conduit 120. A valve 114 determines which compartment 72 or 74 the source liquid fluid 130 enters. The first fluid 78 in the first compartment 72 may have a higher temperature than the second fluid 80 in the second compartment 74. The heat from the first fluid 78 can be transfer to the second fluid 80 through conduction of the first member wall 96. As one example, if hot water is needed, source liquid fluid 130 may enter the first inlet conduit 66, pass through the first heat exchanger 92, exit the first outlet conduit 68 as source vapor fluid 130' and enter the heat engine 106 via conduit 122. The heat engine 106 will use the heat from source vapor fluid 130' to power the apparatus 108 to provide hot water. As another example, if warm water is needed, source liquid fluid 130 may enter the second inlet conduit 69, pass through the second heat exchanger 94, exit the second outlet conduit 70 as source vapor fluid 130' and enter heat engine 106 via conduit 122. The heat engine 106 will use the heat from source vapor fluid 130' to power the apparatus 108 to provide warm water. In either example, the source vapor fluid 130' condenses into source liquid fluid 130 and returns back to the source tank 102 via the conduit 126.

As an alternative, when insufficient solar radiation is present, source liquid fluid 130 may be pumped to a boiler 110 via a conduit 118. The boiler 110 heats the source liquid fluid 130 into source vapor fluid 130'. Source vapor fluid 130' exits the boiler 110 via a conduit 121 and enters the heat engine 106 via conduit 122. The heat engine 106 uses the heat from source vapor fluid 130' to power the apparatus 108 via a conduit 124, which causes the source vapor fluid 130' to condense back into source liquid fluid 130. The source liquid fluid 130 returns back to the source tank 102 via conduit 126. Excess source vapor fluid 130' can be redirected to heat storage tank 60 via conduit 128.

FIG. 8 shows an alternate embodiment of a solar energy collection system of the present disclosure. In this embodiment, prior to filling fluid passages of the solar energy collection system 200 with a heat exchange fluid 206, all fluid passages in the solar energy collection system 200 are first evacuated to a pressure of 1-1000 micron or less so that the fluid passages contain only heat exchange fluid 206. One or more vacuum pumps 222 are attached to conduits in fluid communication with the components of the solar energy collection system 200 to remove gas molecules in order to leave behind a vacuum. As a result, the solar energy collection system 200 is vacuum insulated.

A flat plate solar collector 202 is employed to utilize solar energy 201 to heat the heat exchange fluid 206 contained therein. Source liquid fluid 206 stored within a source tank 204 is transported to a solar collector 202 via a conduit 246 by way of one or more pumps 220. Source liquid fluid 206 enters a supply manifold 208 within the solar collector 202. An absorber 212 attached to supply manifold 208 within the solar collector 202 is filled with source liquid fluid 206 approximately to a top of the absorber 212 to provide a relatively small vapor-phase zone 214 at the upper end of the absorber 212. In one example, propylene glycol may be used as the source fluid 206 for circulation throughout the solar energy collection system 200. Alternatively, other fluids such as water or the like can be a comparable substitute to propylene glycol. However, since propylene glycol has a higher boiling temperature and lower corrosion rate than water, it is a preferred source fluid 206.

Solar radiation 201 absorbed by the absorber 212 within the solar collector 202 causes source liquid fluid 206 therein to boil. When the source liquid fluid 206 is heated to its boiling temperature, the source liquid fluid 206 changes into a source vapor fluid 206'. Source vapor fluid 206' collects in the vapor-phase zone 214 at the upper end of absorber 212 and passes from the vapor-phase zone 214 to a return manifold 210 within solar collector 202. A conduit 248 attached to return manifold 210 transports source vapor fluid 206' to provide heat energy for usage. In this embodiment, there are at least three types of usage for the heat energy generated from source vapor fluid 206' in the solar energy collection system 200: heating, electricity, and/or cooling. The conduit 248 can transport source vapor fluid 206' by a valve 234 within conduit 248 to the desired location to generate the heat energy that is needed. For example, if a user desires warm air or water through an apparatus 217 then source vapor fluid 206' can be transported to a heat exchanger 213. A fluid to be heated (not shown), such as water or air, enters the heat exchanger 213 where heat from source vapor fluid 206' is transferred to the fluid to be heated. The fluid to be heated is utilized by apparatus 217, such as a hot water heater or space heater. As another example, if a user desires electricity through an apparatus 218 then source vapor fluid 206' can be transported to a heat engine 215. The heat engine 215 converts heat from the source vapor fluid 206' to mechanical work in order to provide electricity to the apparatus 218, such as a television or a microwave. Electricity can be generated by a variety of methods, such as, for example, by configuring a turbine to convert heat from the source vapor fluid 206' to electricity. As yet another example, if a user desires cooling through an apparatus 219, such as an air conditioner, then heat from source vapor fluid 206' can be used to operate an absorption chiller 216. Additionally, the absorption chiller 216 can be configured to provide heating. Heat for the absorption chiller 216 may originate from different sources within the system 200. In one example, heat from source vapor fluid 206' generated within a boiler 244 can be used to operate the absorption chiller 216. In practice, the temperature of vapor fluid 206' generated by the boiler 244 may be at least 80 degrees Celsius, and preferably approximately 80 to 100 degrees Celsius, to operate the absorption chiller 216. As another example, heat from the source vapor fluid 206' within a storage tank 224 may be used to operate the absorption chiller 216. Depending upon the desired temperature to operate the absorption chiller 216, the system 200 may use heat from source vapor fluid 206' contained within either a first compartment 226 or a second compartment 228 of the storage tank 224. For example, the first compartment 226 can be used to operate the absorption chiller 216 if the desired temperature is at least 80 degrees Celsius. As another example, the temperature of the source vapor fluid 206' generated by the second compartment 228 may be at least 5 degrees Celsius, and preferably approximately 5 to 30 degrees Celsius, to provide a heat source for the absorption chiller 216. The source vapor fluid 206' condenses back into source liquid fluid 206 and returns back to the source tank 204 via a conduit 250.

Excess source vapor fluid 206' may be redirected to the heat storage tank 224 via a conduit 256. In the depicted embodiment, the storage tank 224 comprises a first compartment 226 and a second compartment 228. The first compartment 226 is configured to store a first liquid fluid 237 therein and the second compartment 228 is configured to store a second liquid fluid 239 therein. Both fluids 237 and 239 can be water, however, the first fluid 237 is preferably a salt compound that changes from a liquid to solid at a preferred thermal energy temperature. For example, the preferred thermal energy temperature can be approximately 90 to 100 degrees Celsius. The first compartment 226 may be a circular cross-section tank arranged coaxially within the second compartment 228. The second compartment 228 may also be a circular cross-section tank arranged coaxially and radially around the first compartment 226. The source vapor fluid 206' can enter either the first compartment 226 or the second compartment 228, which is determined by a valve 234. For example, source vapor fluid 206' can enter a first outlet conduit 238 that is coupled to and extends within the first compartment 226, pass through a first heat exchanger 230 positioned within the first compartment 226, exit a first inlet conduit 236 coupled to and extending within the first compartment 226, and return to the source tank 204 via a conduit 252. In the process, heat from the source vapor fluid 206' is transferred to the first fluid 237 by the first heat exchanger 230. As another example, the source vapor fluid 206' may enter a second outlet conduit 242 that is coupled to and extends within the second compartment 228, pass through a second heat exchanger 232 positioned within the second compartment 228, exit a second inlet conduit 240 coupled to and extending within the second compartment 228, and return to the source tank 204 via the conduit 252. In the process, heat from the source vapor fluid 206' is transferred to the second fluid 239 by the second heat exchanger 232.

Alternatively, when insufficient solar radiation is present, source liquid fluid 206 can be pumped to the storage tank 224 via the conduit 252. The valve 234 coupled to the conduit 252 determines which compartments 226 or 228 the source liquid fluid 206 can enter. Within the first compartment 226, the heat exchanger 230 operates by transferring heat from the fluid 237 to the source liquid fluid 206 to cause a phase change into source vapor fluid 206'. Similarly, within the second compartment 228, the heat exchanger 232 operates by transferring heat from the fluid 239 to the source liquid fluid 206 to cause a phase change into source vapor fluid 206'. From either heat exchanger 230, 232, source vapor fluid 206' is transported to conduit 256 and then to conduit 248, where heat from the source vapor fluid 206' can be used to power apparatus 217, 218 and/or 219, as previously described. The first fluid 237 contained within the first compartment 226 may have a higher temperature than the second fluid 239 contained within the second compartment 228. Heat from the first fluid 237 within the first compartment 226 may transfer to the second fluid 239 within the second compartment 228 through conduction of a first compartment wall (not shown). The compartment 226, 228 that the source liquid fluid 206 passes through depends upon the desired temperature of fluid output by the apparatus 219, 217. As one example, if hot water is needed, source liquid fluid 206 may enter the first inlet conduit 236 coupled to the first compartment 226, pass through the first compartment 226, be heated by the first heat exchanger 230, exit the first outlet conduit 238 as source vapor fluid 206', and enter the heat exchanger 213. The heat exchanger 213 can use the heat from source vapor fluid 206' to power the apparatus 217 to provide hot water. As another example, if warm water is needed, source liquid fluid 206 may enter the second inlet conduit 240 coupled to the second compartment 228, be heated by second heat exchanger 232, exit the second outlet conduit 242 as source vapor fluid 206', and enter the heat exchanger 213. The heat exchanger 213 can use the heat from source vapor fluid 206' to power the apparatus 217 to provide warm water. The source vapor fluid 206' condenses back into source liquid fluid 206 and returns back to the source tank 204 via the conduit 250.

As an alternative, when insufficient solar radiation is present, source liquid fluid 206 may be pumped to a boiler 244 via a conduit 254. The boiler 244 can heat the source liquid fluid 206 into source vapor fluid 206'. The boiler 244 can be heated by a variety of methods, for example, by natural gas or propane. Source vapor fluid 206' may exit the boiler 244 via conduit 260 and may be transported to either the heat exchanger 213, the heat engine 215 or the absorption chiller 216 via conduit 248 to power apparatus 217, 218 or 219, respectively, as previously described. The source vapor fluid 206' condenses back into source liquid fluid 206 and returns back to the source tank 204 via the conduit 250. Excess source vapor fluid 206' can be redirected to heat storage tank 224 via conduit 256, as previously described.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for transporting heat energy by liquid-vapor phase change of a working fluid, comprising:
providing a closed-loop conduit network connecting a heat source and a heat destination, wherein an impermeable housing encloses the closed-loop conduit network forming an insulating space located between and defined by an outer surface of the closed-loop conduit network and an inner surface of the impermeable housing;
evacuating the insulating space such that the working fluid is thermally isolated inside the closed-loop conduit network;
evacuating the closed-loop conduit network to create a vacuum environment therein at a predetermined pressure; and
filling the vacuum environment with the working fluid such that the working fluid is in full contact with an inner surface of the closed-loop conduit network;
whereby the working fluid absorbs heat energy at the heat source, evaporates, flows toward and through the heat destination, at which the working fluid releases heat energy, and condenses to complete the cycle, wherein the full contact with the inner surface of the closed-loop conduit network, thermal isolation, and phase change of the working fluid minimizes heat energy losses to an outside environment and eliminates any substantial temperature differentials within the closed-loop conduit network.

2. The method of claim 1, wherein the heat source is in the form of a solar absorber enclosed by a solar thermal collector configured to transfer heat energy from the sun to the working fluid.

3. The method of claim 1, wherein the heat source is in the form of a first heat exchanger enclosed by a thermal storage tank configured to transfer stored heat energy from a first thermal mass to the working fluid.

4. The method of claim 3, wherein the heat source further comprises a second heat exchanger enclosed by the thermal storage tank and configured to transfer stored heat energy from a second thermal mass to the working fluid, wherein either the first heat exchanger or the second heat exchanger transfer stored heat energy to the working fluid depending on the energy needs of the heat destination.

5. The method of claim 1, wherein the inner surface of the impermeable housing is applied with a layer of radiation shielding.

6. The method of claim 1, further comprising propelling the working fluid through the closed loop system.

7. The method of claim 6, wherein the temperature of the first thermal mass is greater than the temperature of the second thermal mass.

8. The method of claim 1, wherein the heat destination comprises at least one of an absorption chiller to provide space cooling, an air heat exchanger to provide space heating, a water heat exchanger to provide hot water, and a heat engine configured to produce mechanical work.

9. The method of claim 8, wherein the heat engine is coupled to a generator to convert the mechanical work into electrical energy for usage.

10. A method for transporting heat energy by liquid-vapor phase change of a working fluid, comprising:
providing a closed-loop conduit network connecting a heat source and a heat destination;
evacuating the closed-loop conduit network to create a vacuum environment therein at a predetermined pressure; and
filling the vacuum environment with the working fluid such that the working fluid is in full contact with an inner surface of the closed-loop conduit network;
whereby the working fluid absorbs heat energy at the heat source, evaporates, flows toward and through the heat destination, at which the working fluid releases heat energy, and condenses to complete the cycle, wherein the full contact with the inner surface of the closed-loop conduit network and phase change of the working fluid minimizes heat energy losses to an outside environment and eliminates any substantial temperature differentials within the closed-loop conduit network.

11. The method of claim 10, further comprising propelling the working fluid through the closed loop system with a pumping mechanism when gravity flow is not possible.

12. The method of claim 10, wherein the closed-loop conduit network is protected from exposure to the outside environment by an impermeable housing spaced apart from the closed-loop conduit network.

13. The method of claim 10, wherein the heat destination comprises at least one of an absorption chiller to provide space cooling, an air heat exchanger to provide space heating, a water heat exchanger to provide hot water, and a heat engine configured to produce mechanical work.

14. The method of claim 13, wherein the heat engine is coupled to a generator to convert the mechanical work into electrical energy for usage.

15. A method for converting solar energy into power for one or more devices comprising:
receiving, by a solar thermal collector, solar radiation;
converting, by the solar thermal collector, the solar radiation into heat energy within a closed-loop system comprising a vacuum environment and a working fluid;
transferring, by the solar thermal collector, the heat energy to the working fluid causing evaporation of the working fluid to a vapor;
transporting, by a conduit, the vapor comprising the heat energy through the closed-loop system to a heat usage device; and
transferring the heat energy to the heat usage device causing condensation of the vapor to the working fluid, wherein the closed-loop conduit network has substantially consistent temperature throughout and minimizes heat energy loss to an outside environment.

16. The method of claim 15, wherein the closed-loop conduit network comprises a heat exchanger enclosed by a thermal storage tank and configured to transfer stored heat energy from a thermal mass to the working fluid when no solar radiation is received by the solar thermal collector.

17. The method of claim 15, further comprising transporting, by a conduit, the working fluid to a liquid reservoir coupled to the heat usage device.

18. The method of claim 15, wherein the working fluid has the composition of propylene glycol.

19. The method of claim 15, wherein the solar thermal collector further comprises a heat transfer interface, wherein the heat transfer interface comprises an inlet for receiving the working fluid and an outlet for dispensing the vapor, wherein the inlet is at a lower elevation than the outlet allowing the vapor to flow to the heat usage device and preventing any reverse flow in a direction away from the heat usage device.

20. The method of claim 15, wherein the vacuum environment has an absolute pressure that is lower than a vapor pressure of the working fluid at zero degrees Celsius.

* * * * *